(12) United States Patent
Song et al.

(10) Patent No.: US 9,954,316 B2
(45) Date of Patent: Apr. 24, 2018

(54) MODULE RETRACTING TYPE INSTALLING AND UNINSTALLING DEVICE

(71) Applicant: Wuhan Telecommunication Devices Co., Ltd., Wuhan, Hubei Province (CN)

(72) Inventors: Beili Song, Wuhan (CN); Benqing Quan, Wuhan (CN); Yi Jiang, Wuhan (CN)

(73) Assignee: Wuhan Telecommunication Devices Co., Ltd., Wuhan, Hubei Province (CN)

( * ) Notice: Subject to any disclaimer, the term of this patent is extended or adjusted under 35 U.S.C. 154(b) by 0 days.

(21) Appl. No.: 15/523,198

(22) PCT Filed: Dec. 18, 2014

(86) PCT No.: PCT/CN2014/094186
§ 371 (c)(1),
(2) Date: Apr. 28, 2017

(87) PCT Pub. No.: WO2016/065707
PCT Pub. Date: May 6, 2016

(65) Prior Publication Data
US 2017/0324194 A1    Nov. 9, 2017

(30) Foreign Application Priority Data
Oct. 31, 2014    (CN) .......................... 2014 1 0598493

(51) Int. Cl.
*H01R 13/658* (2011.01)
*G02B 6/42* (2006.01)
*H01R 13/633* (2006.01)

(52) U.S. Cl.
CPC ..... *H01R 13/65802* (2013.01); *G02B 6/4202* (2013.01); *H01R 13/6335* (2013.01); *G02B 6/4246* (2013.01); *G02B 6/4292* (2013.01)

(58) Field of Classification Search
CPC .................. G02B 6/4261; H01R 13/62977
See application file for complete search history.

(56) References Cited

U.S. PATENT DOCUMENTS 6,430,053 B1 *   8/2002   Peterson ............ H01R 13/6335
                                                    361/728
6,439,918 B1 *   8/2002   Togami ................ G02B 6/4246
                                                    439/157

(Continued)

FOREIGN PATENT DOCUMENTS

CN           2864720 Y      1/2007
CN        201740891 U      2/2011
(Continued)

*Primary Examiner* — Ross Gushi
(74) *Attorney, Agent, or Firm* — Muncy, Geissler, Olds & Lowe, P.C.

(57) ABSTRACT

A module retracting type installing and uninstalling device, including a base, a slide block, a pressing cover and a bail. The slide block includes a long-strip-shaped slide block base body, and U-shaped grooves are respectively formed in the middle part of two side walls of the slide block base body. A square hole is formed at the rear end of the slide block base body, and is sheathed onto a triangular lock catch of the base. First and second rotating shafts of the bail are respectively located in two snapping grooves at the front end of the base, and third and fourth rotating shafts are respectively located in the U-shaped grooves. The pressing cover includes a square pressing cover base body, and a pressure resilient sheet attached to the upper surface of the slide block and being pressed to the base.

13 Claims, 5 Drawing Sheets

(56) References Cited

U.S. PATENT DOCUMENTS

| | | | | |
|---|---|---|---|---|
| 6,533,603 B1 * | 3/2003 | Togami | | G02B 6/4246 439/157 |
| 6,746,158 B2 * | 6/2004 | Merrick | | G02B 6/4201 24/605 |
| 6,778,399 B2 * | 8/2004 | Medina | | G02B 6/4201 361/728 |
| 6,929,403 B1 * | 8/2005 | Arciniegas | | G02B 6/4201 385/55 |
| 6,997,622 B2 * | 2/2006 | Dodds | | G02B 6/3895 385/92 |
| 7,033,204 B1 * | 4/2006 | Wang | | H01R 13/6335 385/147 |
| 7,040,911 B1 * | 5/2006 | Ho | | G02B 6/4292 439/352 |
| 7,066,746 B1 * | 6/2006 | Togami | | G02B 6/4246 385/53 |
| 7,108,523 B2 * | 9/2006 | Hartman | | H01R 13/6582 439/157 |
| 7,186,134 B2 * | 3/2007 | Togami | | G02B 6/4246 439/160 |
| 7,204,712 B2 * | 4/2007 | Schwiebert | | G02B 6/4201 439/352 |
| 7,212,410 B2 * | 5/2007 | Larson | | G02B 6/4292 361/726 |
| 7,255,484 B2 * | 8/2007 | Walker, Jr. | | G02B 6/4246 385/53 |
| 7,255,490 B2 * | 8/2007 | Zhang | | G02B 6/4246 385/139 |
| 7,314,384 B2 * | 1/2008 | Togami | | G02B 6/4246 439/160 |
| 7,387,538 B2 * | 6/2008 | Engel | | H01R 13/6658 439/620.23 |
| 7,448,899 B2 * | 11/2008 | Chen | | G11B 5/4846 439/372 |
| 7,477,825 B2 * | 1/2009 | Walker | | G02B 6/4246 385/134 |
| 7,507,111 B2 * | 3/2009 | Togami | | G02B 6/4246 385/88 |
| 7,712,969 B2 * | 5/2010 | Song | | G02B 6/4261 385/53 |
| 8,939,658 B2 * | 1/2015 | Heimbuch | | G02B 6/36 385/88 |
| 9,063,308 B2 * | 6/2015 | Heimbuch | | G02B 6/36 |
| 2003/0171022 A1 * | 9/2003 | Distad | | G02B 6/4261 439/372 |
| 2007/0041687 A1 * | 2/2007 | Mizue | | G02B 6/4277 385/92 |
| 2007/0059953 A1 | 3/2007 | Togami et al. | | |
| 2007/0224884 A1 * | 9/2007 | Engel | | H01R 13/6658 439/607.01 |
| 2007/0237489 A1 * | 10/2007 | Sasser | | G02B 6/4246 385/147 |
| 2014/0140666 A1 * | 5/2014 | Heimbuch | | G02B 6/36 385/92 |

FOREIGN PATENT DOCUMENTS

| | | |
|---|---|---|
| CN | 201830262 U | 5/2011 |
| CN | 103323920 A | 9/2013 |
| JP | 2005338247 A | 12/2005 |
| JP | 2008090148 A | 4/2008 |

* cited by examiner

MODULE RETRACTING TYPE INSTALLING AND UNINSTALLING DEVICE

TECHNICAL FIELD

The present invention relates to the installing and uninstalling of optical-electric module in the field of optical communication, and particularly to a module retracting type installing and uninstalling device.

BACKGROUND ART

Presently, minitype pluggable modules have been widely applied to the field of optical communication. A large-scale system device can be installed with multiple modules, to transfer data to the television network, the telecommunication network and the internet. In order to ensure that the modules operate stably and reliably on system devices, a variety of installing and unloading devices have been developed, which work mainly by three modes, wherein one mode is that a slide block forwardly pushes out a lock catch of a shielding cage, and the shortcoming of the mode is that it relatively relies on the shape of the shrapnel of the front end of the shielding cage; the second is that a latch withdraws into the module to disengage the lock catch of the shielding cage, and the shortcoming of the mode is that the structure is in general relatively complicated, the dimensional accuracy of key structures is not high, and the reliability cannot be guaranteed; and the third mode is that tools are required to uninstall the modules, and the shortcoming of the mode is that the structures are required to be customized, and the versatility is poor.

Therefore, there is need to design a novel module retracting type installing and uninstalling device, to overcome the above problems.

Technical Problem

An object of the present invention is to overcome the defects of the prior art, and provide a module retracting type installing and uninstalling device having a simple structure, wide application range, good compatibility, low cost and high reliability.

Solution of the Problems

Technical Solution

In order to achieve the above objects, the present invention provides a module retracting type installing and uninstalling device, comprising a base, a slide block, a pressing cover and a bail, wherein the slide block is provided above the base, the bail passes through the slide block and is nested around the base, and the pressing cover is provided above the slide block; the slide block comprises an elongated slide block base body, two relatively longer sides of the slide block base body connect to side walls adjacent to front ends, middle portions of the two side walls are individually provided with a U-shaped groove, circle centers of the two U-shaped grooves are arranged oppositely and concentrically, the slide block base body is provided with a curve structure adjacent to the middle portion, postmedian portion of the slide block base body clings to the surface of the base, rear end of the slide block base body is provided with a square hole, and the square hole is nested around a triangular latch of the base; and the bail is provided with a first rotating shaft, a second rotating shaft, a third rotating shaft and a fourth rotating shaft, wherein, the first rotating shaft and the second rotating shaft are individually located in two snap slots at two sides of the front end of the base, and the first rotating shaft and the second rotating shaft are arranged concentrically, and the third rotating shaft and the fourth rotating shaft are located in the two U-shaped grooves, and the third rotating shaft and the fourth rotating shaft are arranged concentrically; and the pressing cover comprises a square pressing cover base body, a pressure resilient sheet is provided at the rear of an upper surface of the pressing cover base body, and the pressure resilient sheet clings to the upper surface at a lower location of the slide block, and is pressed on the base.

Preferably, a seam is provided at the joint between the third rotating shaft and the fourth rotating shaft, and the seam is able to be fixedly connected by welding.

Preferably, the bail has individually at two sides a first side arm and a second side arm, and has a handle at a bottom, wherein an upper end of the first side arm connects to the first rotating shaft, the first rotating shaft connects to the third rotating shaft, a lower end of the first side arm connects to the handle, the other end of the handle connects to a lower end of the second side arm, an upper end of the second side arm connects to the second rotating shaft, and the second rotating shaft connects to the fourth rotating shaft.

Preferably, an upper part of the slide block has an upper plane, a lower plane and a curve face that connects the upper plane and the lower plane, rear end of the lower plane is provided with a square hole, and the square hole is provided with a sliding side.

Preferably, the curve face is provided with at least one reinforcing rib.

Preferably, two sides of an upper surface of the pressing cover base body individually have a first side wall and a second side wall, the first side wall is provided with a first clipping hole, the second side wall is provided with a second clipping hole, and the front ends of the upper surface is provided adjacent to the two sides individually with a first depression and a second depression.

Preferably, the position where the upper surface of the pressing cover base body and the pressure resilient sheet connect is provided with at least one reinforcing rib.

Preferably, the base is a metal elongated cavity body, a front end of the base is a smooth mouth end face, and the base is made by die casting, powder metallurgy or machining.

Preferably, middle portion of up front part of the base is provided with an elongated slot, two sides of the elongated slot are individually provided with a third side wall, a fourth side wall, a fifth side wall and a sixth side wall, a friction surface is provided between the fifth side wall and the sixth side wall, the triangular latch is provided behind the friction surface, and the triangular latch is provided with a bevel.

Preferably, the module retracting type installing and uninstalling device is provided in a metal shielding cage, a lower side of the metal shielding cage has a spring leaf, the spring leaf is provided with a triangular clipping hole, and the triangular latch is snapped-fitted in the triangular clipping hole.

Advantageous Effects of the Invention

Advantageous Effects

The present invention has the following advantageous effects:

The module retracting type installing and uninstalling device comprises a base, a slide block, a pressing cover and a bail, wherein the slide block is provided above the base, the bail passes through the slide block and is nested around the base, and the pressing cover is provided above the slide block; wherein, rear end of the slide block base body is provided with a square hole, and the square hole is nested around a triangular latch of the base; the first rotating shaft and the second rotating shaft are individually located in two snap slots at two sides of the front end of the base; and a pressure resilient sheet is provided at the rear of an upper surface of the pressing cover base body, and the pressure resilient sheet clings to the upper surface at a lower location of the slide block, and is pressed on the base. The module retracting type installing and uninstalling device, by employing the above structure, can achieve advantageous effects such as stable and reliable installing and uninstalling functions, good compatibility with various types of shielding cages, simple structure, low cost and good reliability.

BRIEF DESCRIPTION OF THE DRAWINGS

The Drawings

In order to more clearly illustrate the embodiments of the present invention or the technical solutions in the prior art, the figures that are required to describe the embodiments or the prior art will be briefly introduced below. Apparently, the figures that are described below are merely embodiments of the present invention, and a person skilled in the art can obtain other figures according to these figures without paying creative work.

EMBODIMENTS OF THE PRESENT INVENTION

The technical solutions of the embodiments of the present invention will be clearly and completely described below by referring to the drawings of the embodiments of the present invention. Apparently, the described embodiments are merely some embodiments of the present invention, and are not all of the embodiments of the present invention. All the embodiments that a person skilled in the art obtains on the basis of the embodiments of the present invention without paying creative work fall within the protection scope of the present invention.

As shown in FIG. 1 to FIG. 12, the embodiments of the present invention provide a module retracting type installing and uninstalling device, comprising a base 400, a slide block 200, a pressing cover 300 and a bail 100, wherein the slide block 200 is provided above the base 400, the bail 100 passes through the slide block 200 and is nested around the base 400, and the pressing cover 300 is provided above the slide block 200.

As shown in FIG. 1 to FIG. 12, the slide block 200 comprises an elongated slide block base body, two relatively longer sides of the slide block base body connect to side walls adjacent to front ends 207, 208, the middle portions of the two side walls 207, 208 are individually provided with a U-shaped groove 205, 206, the circle centers of the two U-shaped grooves 205, 206 are arranged oppositely and concentrically, the slide block base body is provided with a curve structure adjacent to the middle portion, the postmedian portion of the slide block base body clings to the surface of the base 400, the rear end of the slide block base body is provided with a square hole 201, and the square hole 201 is nested around a triangular latch 412 of the base 400. The bail 100 is provided with a first rotating shaft 101, a second rotating shaft 102, a third rotating shaft 103 and a fourth rotating shaft 104, wherein, the first rotating shaft 101 and the second rotating shaft 102 are individually located in two snap slots 405, 406 at two sides of the front end of the base 400, and the first rotating shaft 101 and the second rotating shaft 102 are arranged concentrically, and the third rotating shaft 103 and the fourth rotating shaft 104 are located in the two U-shaped grooves 205, 206 and the third rotating shaft 103 and the fourth rotating shaft 104 are arranged concentrically. The pressing cover 300 comprises a square pressing cover base body, and the front ends of the pressing cover base body is provided adjacent to the two sides with two depressions 301, 302. The two sides of the pressing cover base body individually connects to side walls 303, 304, the middle portions of the two side walls 303, 304 are individually provided with a clipping hole 305, 306, the two clipping holes 305, 306 are individually nested around inverse clips 403, 404 on the two sides of the up front part of the base 400, a pressure resilient sheet 307 is provided at the rear of an upper surface of the pressing cover base body, and the pressure resilient sheet 307 clings to the upper surface at a lower location of the slide block 200, and is pressed on the base 400.

Figure 5:
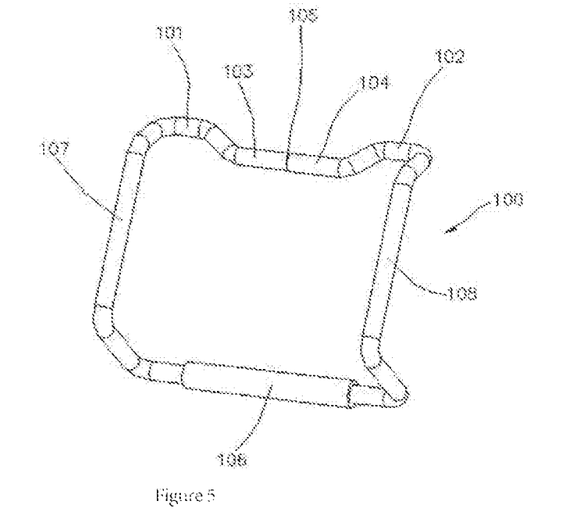
FIG. 5 is the perspective view of the bail that is provided by the embodiments of the present invention.

In that, the bail 100 is an elastic metal ring. Specially, the bail 100 is provided with a first rotating shaft 101, a second rotating shaft 102, a third rotating shaft 103 and a fourth rotating shaft 104, wherein the first rotating shaft 101 and the second rotating shaft 102 are coaxial, the third rotating shaft 103 and the fourth rotating shaft 104 are coaxial, a seam 105 is provided at the joint between the third rotating shaft 103 and the fourth rotating shaft 104, and the seam 105 is able to be connected by welding or other fixed connection modes to strengthen the bulk strength of the bail 100. The bail 100 has individually at two sides a first side arm 107 and a second side arm 108, and has a handle 106 at the bottom. The upper end of the first side arm 107 connects to the first rotating shaft 101, the first rotating shaft 101 connects to the third rotating shaft 103, the lower end of the first side arm 107 connects to the handle 106, the other end of the handle 106 connects to the lower end of the second side arm 108, the upper end of the second side arm 108 connects to the second rotating shaft 102, and the second rotating shaft 102 connects to the fourth rotating shaft 104. In that, the handle 106 is painted with different colors, to indicate optical fibers of different wavelengths.

Figure 6:
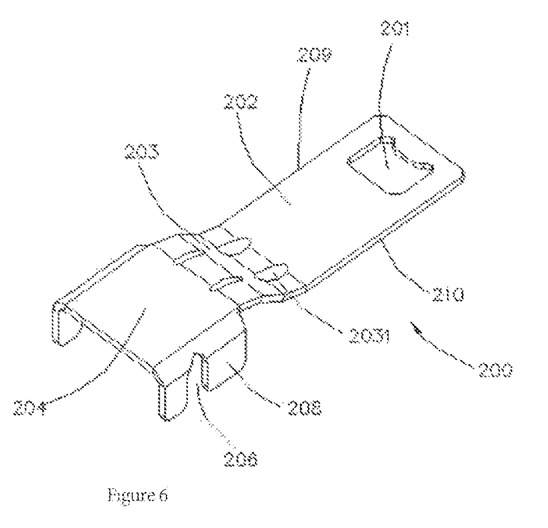
FIG. 6 is the perspective view of the slide block that is provided by the embodiments of the present invention.
Figure 7:
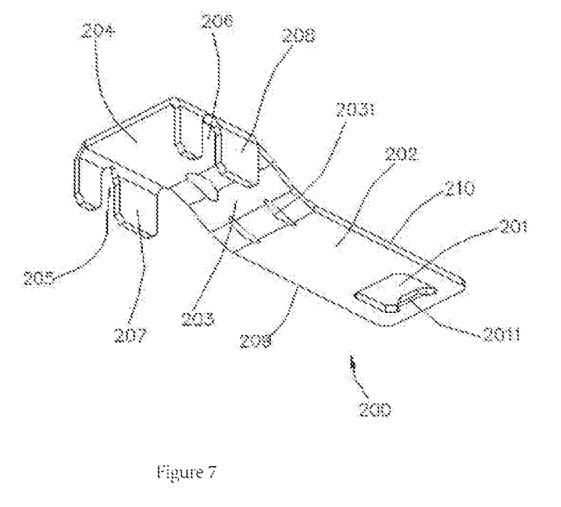
FIG. 7 is the perspective view from another visual angle of the slide block that is provided by the embodiments of the present invention.

The upper part of the slide block has an upper plane 204, a lower plane 202 and a curve face 203 that connects to the upper plane 204 and the lower plane 202, the rear end of the lower plane 202 is provided with a square hole 201, the square hole 201 is provided with a sliding side 2011, the two sides of the upper plane 204 are individually provided with a first side wall 207 and a second side wall 208, the first side wall 207 is provided with a first U-shaped groove 205, and the second side wall 208 is provided with a second U-shaped groove 206. In order to improve the rigidity of the curve face 203, at least one reinforcing rib 2031 may be provided at the curving of the curve face 203, and the number of the reinforcing ribs 2031 may be determined according to practical demands.

Figure 8:
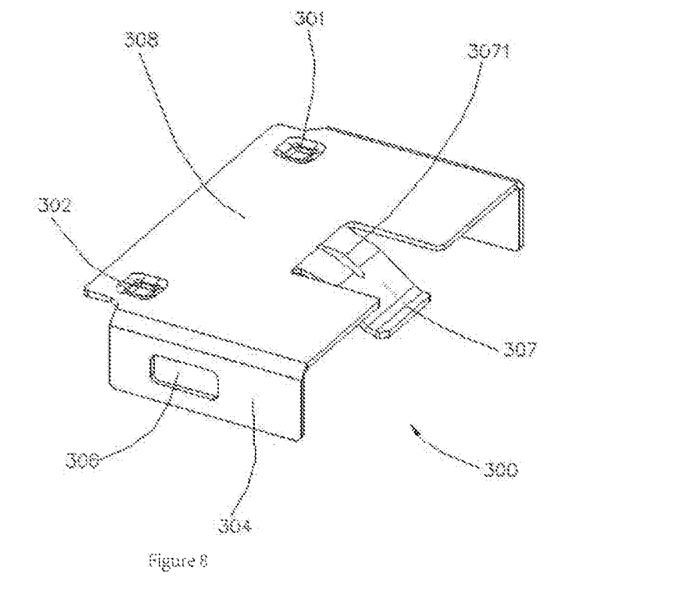
FIG. 8 is the perspective view of the pressing cover that is provided by the embodiments of the present invention.
Figure 9:
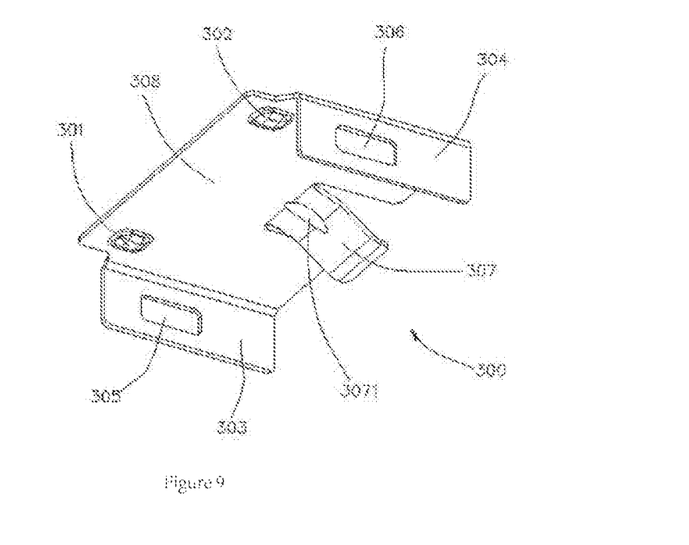
FIG. 9 is the perspective view from another visual angle of the pressing cover that is provided by the embodiments of the present invention.

The pressing cover 300 is a metal plate structure of an irregular shape, and comprises a square pressing cover base body. Specially, the two sides of the upper surface 308 of the pressing cover base body individually have a first side wall 303 and a second side wall 304, the first side wall 303 is provided with a first clipping hole 305, and the second side wall 304 is provided with a second clipping hole 306; the front ends of the upper surface 308 is provided adjacent to the two sides individually with a first depression 301 and a second depression 302; and the middle portion of the rear of the upper surface 308 is provided with a pressure resilient sheet 307. In order to strengthen the rigidity of the pressure resilient sheet 307, the position where the upper surface 308 of the pressing cover base body and the pressure resilient sheet 307 is provided with at least one reinforcing rib 3071, and the number of the reinforcing ribs 3071 may be determined according to practical demands.

Figure 1:
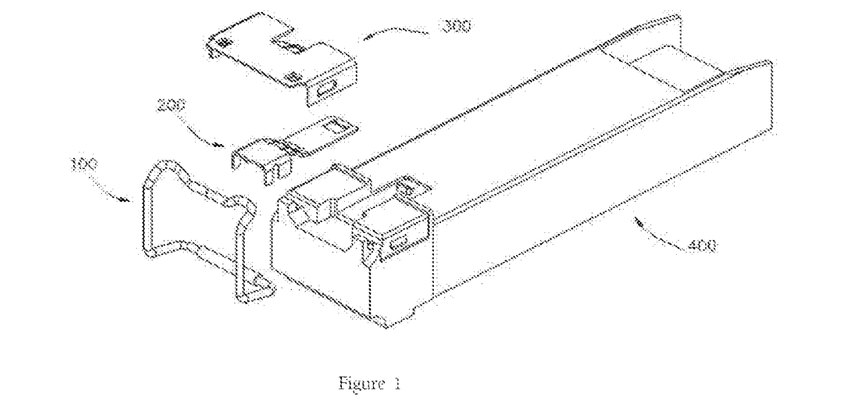
FIG. 1 is the exploded view of the structure of the module retracting type installing and uninstalling device that is provided by the embodiments of the present invention.
Figure 2:
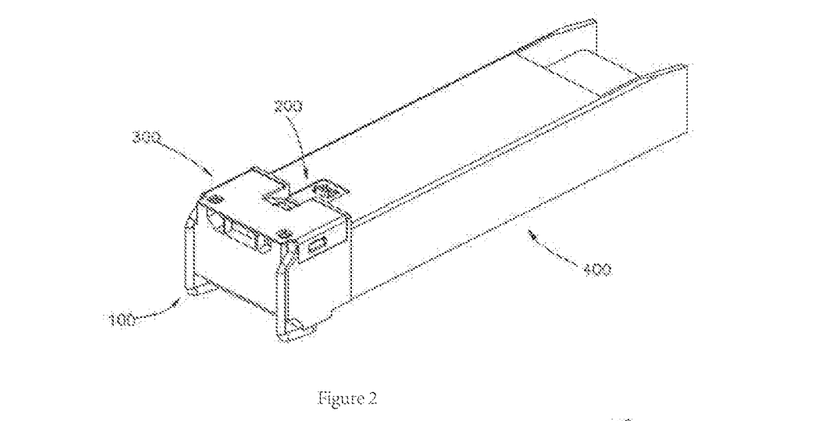
FIG. 2 is the perspective view of the module retracting type installing and uninstalling device that is provided by the embodiments of the present invention.
Figure 3:
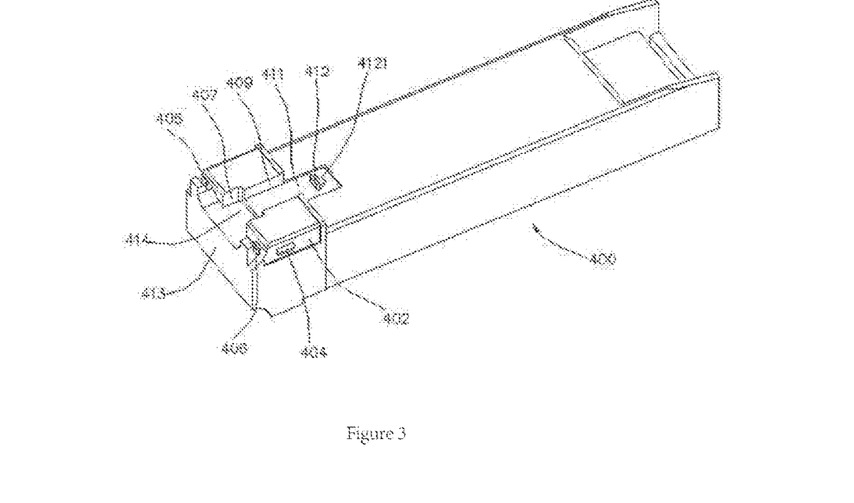
FIG. 3 is the perspective view of the base that is provided by the embodiments of the present invention.
Figure 4:
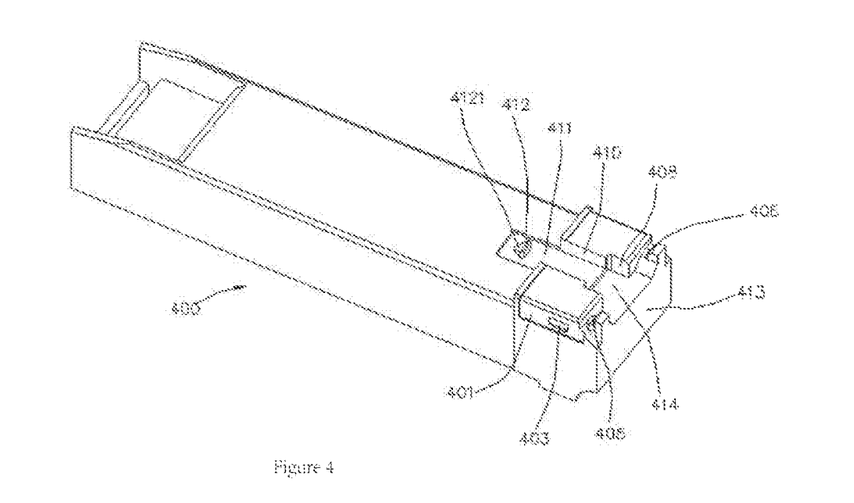
FIG. 4 is the perspective view from another visual angle of the base that is provided by the embodiments of the present invention.

The base 400 is a metal elongated cavity body, the front end of the base is a smooth mouth end face 413, from which optical fibers are accessed, and the base 400 is made by die casting, powder metallurgy, machining or other means. The base 400 has in the up front part adjacent to the two sides individually a first snap slot 405 and a second snap slot 406, the two sides of the up front part of the base 400 individually have a first side wall 401 and a second side wall 402, the first side wall 401 has a first inverse clip 403, and the second side wall 402 has a second inverse clip 404. The middle portion of the up front part of the base 400 is provided with an elongated slot 414, and the two sides of the elongated slot 414 are individually provided with a third side wall 407, a fourth side wall 408, a fifth side wall 409 and a sixth side wall 410. A friction surface 411 is provided between the fifth side wall 409 and the sixth side wall 410, a triangular latch 412 is provided behind the friction surface 411, and the triangular latch 412 is provided with a bevel 4121.

Figure 11:
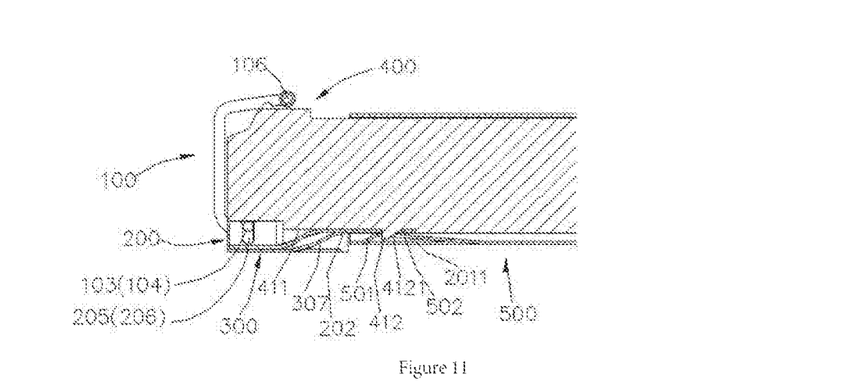
FIG. 11 is the sectional view of the module retracting type installing and uninstalling device that is provided by the embodiments of the present invention when installed on the system device.
Figure 12:
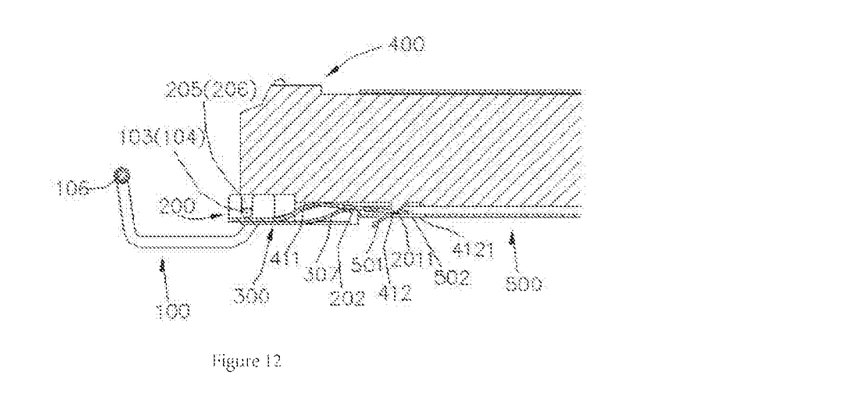
FIG. 12 is the sectional view of the module retracting type installing and uninstalling device that is provided by the embodiments of the present invention when it is to be uninstalled from the system device.

The module retracting type installing and uninstalling device is installed in a metal shielding cage 500 on the system device, the lower side of the metal shielding cage 500 has a spring leaf 501, the spring leaf 501 is provided with a triangular clipping hole 502, and the triangular latch 412 is snapped-fitted in the triangular clipping hole 502.

Figure 10:
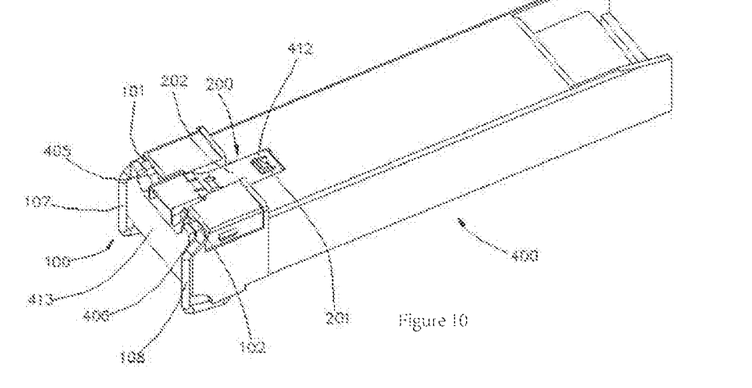
FIG. 10 is the perspective view of the assembly of the base, the bail and the slide block that are provided by the embodiments of the present invention.

The assembling of the bail 100 is as follows: the first rotating shaft 101 is provided in the first snap slot 405 of the base 400, and the second rotating shaft 102 is provided in the second snap slot 406 of the base 400; the third rotating shaft 103 is provided in the first U-shaped groove 205 of the slide block 200, and the fourth rotating shaft 104 is provided in the second U-shaped groove 206 of the slide block 200; and in the locking state, the first side wall 107 and the second side wall 108 are located in front of the smooth mouth end face 413 of the base 400.

The assembling of the slide block 200 is as follows: the third rotating shaft 103 of the bail 100 is provided in the first U-shaped groove 205, and the fourth rotating shaft 104 of the bail 100 is provided in the second U-shaped groove 206; the upper surface of the lower plane 202 clings to the pressure resilient sheet 307 of the pressing cover 300, and in the installing and locking state, the lower surface of the lower plane 202 clings to the long platform 411 of the base 400; the square hole 201 is provided around the triangular latch 412 of the base 400; in the uninstalling and unblocking state, the sliding side 2011 slides on the bevel 4121 of the base 400; and the slide block 200 is located in the elongated slot 414 at the up front part of the base 400, wherein the first side wall 207 slides along the third side wall 407 of the base 400, the second side wall 208 slides along the fourth side wall 408 of the base 400, the first side 209 slides along the fifth side wall 409 of the base 400, and the second side 210 slides along the sixth side wall 410 of the base 400.

The assembling of the pressing cover 300 is as follows: the pressing cover 300 is located above the base 400, the bail 100 and the slide block 200; the first side wall 303 clings to the first side wall 401 of the base 400, and the second side wall 304 clings to the second side wall 402 of the base 400; the first clipping hole 305 is nested around the first inverse clip 403 of the base 400, and the second clipping hole 306 is nested around the second inverse clip 404 of the base 400; the first depression 301 is located on the first rotating shaft 101 of the bail 100, and the second depression 302 is located on the second rotating shaft 102 of the bail 100; and the pressure resilient sheet 307 clings to the upper surface of the lower plane 202 of the slide block 200.

The assembling of the base 400 is as follows: the first rotating shaft 101 of the bail 100 is provided in the first snap slot 405, and the second rotating shaft 102 of the bail 100 is provided in the second snap slot 406; in the installing and locking state, the smooth mouth end face 413 is provided adjacent to the two sides individually with the first side arm 107 and the second side arm 108 of the bail 100; the slide block 200 is provided in the elongated slot 414, wherein the third side wall 407 and the first side wall 207 of the slide block 200 are slide-fitted, the fourth side wall 408 and the second side wall 208 of the slide block 200 are slide-fitted, the fifth side wall 409 and the first side 209 of the slide block 200 are slide-fitted, and the sixth side wall 410 and the second side 210 of the slide block 200 are slide-fitted; the square hole 201 of the slide block 200 is provided around the triangular latch 412; in the uninstalling and unblocking state, the bevel 4121 and the sliding side 2011 of the slide block 200 are slide-fitted; in the installing and locking state, the long platform 411 clings to the lower surface of the lower plane 202 of the pressing cover 200; the first side wall 401 clings to the first side wall 303 of the pressing cover 300, and the second side wall 402 clings to the second side wall 304 of the pressing cover 300; and the first clipping hole 305 of the pressing cover 300 is provided around the first inverse clip 403, and the second clipping hole 306 of the pressing cover 300 is provided around the second inverse clip 404.

As shown in FIG. 1 to FIG. 12, the working process of the module retracting type installing and uninstalling device is as follows:

The module retracting type installing and uninstalling device is horizontally inserted into the metal shielding cage 500 on the system device, the triangular latch 412 on the base 400 jacks the spring leaf 501 of the metal shielding cage 500, and continues pushing the module into the metal shielding cage 500, the triangular latch 412 on the base 400 enters the triangular clipping hole 502 on the spring leaf 501, and the triangular clipping hole 502 on the spring leaf 501 hooks the triangular latch 412 on the base 400. At the moment, the module retracting type installing and uninstalling device is reliably installed in the metal shielding cage 500 of the system device and normally operates.

The handle 106 of the bail 100 is pulled up, the third rotating shaft 103 and the fourth rotating shaft 104 of the bail 100 rotate around the first rotating shaft 101 and the second rotating shaft 102 of the bail 100, and the third rotating shaft 103 and the fourth rotating shaft 104 of the bail 100 drive the slide block 200 to move in the opposite direction toward the triangular latch 412 of the base 400. Simultaneously, the sliding side 2011 of the slide block 200 slides on the bevel 4121 of the base 400 forwards and upwards, drives the rear end of the lower plane 202 of the slide block 200 to tilt, and brings the triangular clipping hole 502 on the spring leaf 501 of the metal shielding cage 500 out of the triangular latch 412 of the base 400. At the moment, the handle 106 of the bail 100 is pulled again, to pull out the module retracting type installing and uninstalling device horizontally in the opposite direction of the metal shielding cage 500, to smoothly uninstall the module retracting type installing and uninstalling device from the system device.

In conclusion, the module retracting type installing and uninstalling device, by employing the above structure, has the following advantageous effects:

1. The device has stable and reliable installing and uninstalling functions, and is compatible with various types of shielding cages, with wide application range and good compatibility;

2. The parts have simple and environment-friendly manufacturing processes and small amounts, and their assembling is simple, efficient and cheap;

3. The materials of the parts have high reliability, and can withstand rigid reliability tests.

The above description is merely preferred embodiments of the present invention, and is not indented to limit the present invention. Any modifications, equivalent substitutions and improvements that are made within the spirit and principle of the present invention should fall within the protection scope of the present invention.

The invention claimed is:

1. A module retracting type installing and uninstalling device, wherein, the device comprises a base, a slide block, a pressing cover and a bail, wherein the slide block is provided above the base, the bail passes through the slide block and is nested around the base, and the pressing cover is provided above the slide block;

the slide block comprises an elongated slide block base body, two relatively longer sides of the slide block base body connect to side walls adjacent to front ends, middle portions of the two side walls are individually provided with a U-shaped groove, circle centers of the two U-shaped grooves are arranged oppositely and concentrically, the slide block base body is provided with a curve structure adjacent to the middle portion, postmedian portion of the slide block base body clings to the surface of the base, rear end of the slide block base body is provided with a square hole, and the square hole is nested around a triangular latch of the base; and the bail is provided with a first rotating shaft, a second rotating shaft, a third rotating shaft and a fourth rotating shaft, wherein, the first rotating shaft and the second rotating shaft are individually located in two snap slots at two sides of the front end of the base, and the first rotating shaft and the second rotating shaft are arranged concentrically, and the third rotating shaft and the fourth rotating shaft are located in the two U-shaped grooves, and the third rotating shaft and the fourth rotating shaft are arranged concentrically; and the pressing cover comprises a square pressing cover base body, a pressure resilient sheet is provided at the rear of an upper surface of the pressing cover base body, and the pressure resilient sheet presses tightly a lower plane of the slide block, and the lower plane presses the base.

2. The module retracting type installing and uninstalling device according to claim 1, wherein: a seam is provided at the joint between the third rotating shaft and the fourth rotating shaft, and the seam is able to be fixedly connected by welding.

3. The module retracting type installing and uninstalling device according to claim 2, wherein:

the bail has individually at two sides a first side arm and a second side arm, and has a handle at a bottom, wherein an upper end of the first side arm connects to the first rotating shaft, the first rotating shaft connects to the third rotating shaft, a lower end of the first side arm connects to the handle, the other end of the handle connects to a lower end of the second side arm, an upper end of the second side arm connects to the second rotating shaft, and the second rotating shaft connects to the fourth rotating shaft.

4. The module retracting type installing and uninstalling device according to claim 1, wherein:

the bail has individually at two sides a first side arm and a second side arm, and has a handle at a bottom, wherein an upper end of the first side arm connects to the first rotating shaft, the first rotating shaft connects to the third rotating shaft, a lower end of the first side arm connects to the handle, the other end of the handle connects to a lower end of the second side arm, an upper end of the second side arm connects to the second rotating shaft, and the second rotating shaft connects to the fourth rotating shaft.

5. The module retracting type installing and uninstalling device according to claim 1, wherein: an upper part of the slide block has an upper plane, the lower plane and a curve face that connects the upper plane and the lower plane, rear end of the lower plane is provided with a square hole, and the square hole is provided with a sliding side.

6. The module retracting type installing and uninstalling device according to claim 5, wherein: the curve face is provided with at least one reinforcing rib.

7. The module retracting type installing and uninstalling device according to claim 1, wherein: two sides of an upper surface of the pressing cover base body individually have a first side wall and a second side wall, the first side wall is provided with a first clipping hole, the second side wall is provided with a second clipping hole, and the front ends of the upper surface is provided adjacent to the two sides individually with a first depression and a second depression.

8. The module retracting type installing and uninstalling device according to claim 7, wherein:
the position where the upper surface of the pressing cover base body and the pressure resilient sheet connect is provided with at least one reinforcing rib.

9. The module retracting type installing and uninstalling device according to claim 1, wherein:
the position where the upper surface of the pressing cover base body and the pressure resilient sheet connect is provided with at least one reinforcing rib.

10. The module retracting type installing and uninstalling device according to claim 1, wherein: the base is a metal elongated cavity body, a front end of the base is a smooth mouth end face, and the base is made by die casting, powder metallurgy or machining.

11. The module retracting type installing and uninstalling device according to claim 10, wherein:
middle portion of up front part of the base is provided with an elongated slot, two sides of the elongated slot are individually provided with a third side wall, a fourth side wall, a fifth side wall and a sixth side wall, a friction surface is provided between the fifth side wall and the sixth side wall, the triangular latch is provided behind the friction surface, and the triangular latch is provided with a bevel.

12. The module retracting type installing and uninstalling device according to claim 1, wherein:
middle portion of up front part of the base is provided with an elongated slot, two sides of the elongated slot are individually provided with a third side wall, a fourth side wall, a fifth side wall and a sixth side wall, a friction surface is provided between the fifth side wall and the sixth side wall, the triangular latch is provided behind the friction surface, and the triangular latch is provided with a bevel.

13. The module retracting type installing and uninstalling device according to claim 1, wherein: the module retracting type installing and uninstalling device is provided in a metal shielding cage, a lower side of the metal shielding cage has a spring leaf, the spring leaf is provided with a triangular clipping hole, and the triangular latch is snapped-fitted in the triangular clipping hole.

* * * * *